United States Patent [19]
Becker

[11] 3,820,329
[45] June 28, 1974

[54] VENTED HYDRAULIC COUPLING

[75] Inventor: John E. Becker, Bowmanville, Ontario, Canada

[73] Assignee: Cluaran Associates Ltd., Oshawa, Ontario, Canada

[22] Filed: Feb. 12, 1973

[21] Appl. No.: 331,713

[52] U.S. Cl.................................. 60/336, 60/337
[51] Int. Cl............................................ F16h 41/30
[58] Field of Search...................... 60/336, 337, 330

[56] References Cited
UNITED STATES PATENTS

| | | | |
|---|---|---|---|
| 2,432,191 | 12/1947 | Chilton | 60/360 |
| 3,363,417 | 1/1968 | Becker | 60/337 |
| 3,399,533 | 9/1968 | Becker | 60/336 |

*Primary Examiner*—Edgar W. Geoghegan
*Attorney, Agent, or Firm*—Stanley J. Rogers

[57] ABSTRACT

In a hydraulic coupling venting under all conditions of the torque-transmitting vortices is obtained by providing a first vent opening to a liquid-free space in the radially-innermost part of the working circuit. A second vent is provided opening to the centre of the working chamber, both vents being closed when the coupling pump is rotating at less than a predetermined speed by means of centrifugally-operated valve. The inlet to the first vent may be located downstream of a protecting step provided by the turbine and is provided with a deflector. With normal vortices the first vent is effective and with attenuated vortices at stall or its equivalent the second vent is effective.

7 Claims, 4 Drawing Figures

VENTED HYDRAULIC COUPLING

FIELD OF THE INVENTION

This invention is concerned with improvements in or relating to hydraulic couplings, of the kind comprising a pump element and a turbine element (sometimes known respectively as an impeller element and a runner element), each provided with a plurality of radially-extending vortex-producing vanes, the interiors of the elements together forming a working chamber containing a quantity of working liquid, usually an oil, and the two elements being coupled together for the transmission of torque between them by liquid vortices that are established in the working chamber between the said vanes.

REVIEW OF THE PRIOR ART

Hydraulic couplings are commonly employed in power transmission systems between a prime mover, such as an internal combustion engine or an electric motor, and a load to be driven by the prime mover. In an ideal arrangement the torque transmitted by the coupling is negligible while the prime mover is idling and increases smoothly and progressively to a maximum when the prime mover reaches its designed optimum speed range. If at any time the coupling output member is overloaded or stalled, the maximum torque that can be transmitted by the coupling is automatically limited to a value such that the prime mover continues to run within its optimum speed range, at which it is supplying its maximum available output torque.

Even when operating at maximum efficiency the two coupling elements must slip relative to one another, usually about 2 – 5 percent, to maintain the vortices, the power that is lost being dissipated in the form of heat in the working fluid, from which it is transmitted to the coupling structure, and to the cooling means that are usually provided. If the coupling is subjected to an overload then the slip is increased, increasing the heat produced in the coupling, and if the load is completely stalled then substantially all of the power produced by the prime mover must be dissipated by the coupling.

It will be seen therefore that even with the normal operation of a coupling the working liquid is subjected to mechanical churning between the relatively moving vanes, and moreover may be heated to relatively high temperatures, both of which conditions tend to cause generation of gas and/or vapour, with the consequent production of high internal pressures in the coupling. It has not been unknown for couplings to explode as a result of these internal pressures. Reference is made to my prior U.S. Pat. No. 3,399,533 which discloses one way of venting a coupling interior to the ambient atmosphere, so as to avoid the usual previous solution, which was to make the coupling sufficiently strong to withstand the pressures encountered in normal operation, with the result that couplings are regarded as being necessarily heavy and expensive. The more severe conditions of a lengthy complete stall commonly are met by the provision of pressure relief valves which open at a predetermined high internal pressure and discharge the whole contents of the working chamber to another vented chamber, or by the provision of a fusible plug which melts when the working fluid becomes too hot, and allows it to escape from the working chamber.

DEFINITION OF THE INVENTION

It is an object of the present invention to provide a new hydraulic coupling with which the interior of the working chamber can be vented to the ambient atmosphere while the coupling is in operation.

It is another object to provide such a new coupling that is of lighter mechanical construction than corresponding couplings known hitherto.

In accordance with the present invention there is provided a hydraulic coupling comprising power input and power output means, a pump element and a turbine element mounted upon respective hub members which are connected respectively to the power input and power output means for rotation of the elements therewith about a common axis and providing respectively cooperating pump and turbine chambers, said chambers together forming a working chamber, a plurality of radially-extending vortex-producing vanes in each of the pump and turbine chambers, a quantity of working liquid in the said working chamber, vent means carried by one of said elements providing a vent bore having an inlet opening into the interior of the respective chamber at a liquid-free radially inner part thereof at or closely adjacent to the respective hub member and an outlet opening to the exterior of the working chamber, and a valve closing the said bore against passage of liquid therethrough while the respective element is stationary and opening the said bore when the element is rotating at more than a predetermined minimum speed.

DESCRIPTION OF THE DRAWINGS

Particular preferred embodiments will now be described, by way of example, with reference to the accompanying diagrammatic drawings, wherein.

DESCRIPTION OF THE PREFERRED EMBODIMENTS

Figure 1:
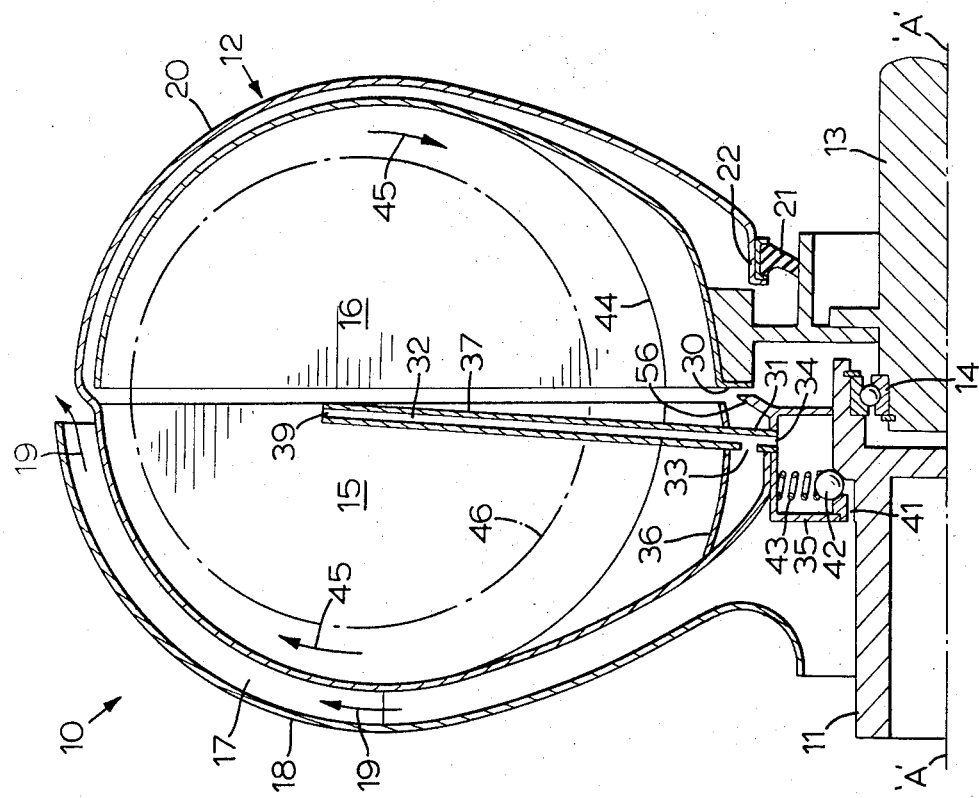
FIGS. 1 to 4 are each a part-sectional view of the upper part of a respective embodiment, comprising a plane cross-section taken along the axis of rotation of the coupling.

Similar parts are given the same reference number in all the figures of the drawings.

The couplings illustrated herein comprise a pump element 10 mounted on a power input shaft 11 that is adapted to be connected to a prime mover, such as an internal combustion engine or an electric motor, and a turbine element 12 mounted on a power output shaft 13, that is adapted to be connected to apparatus to be driven via the coupling. The immediately adjacent inner ends of the two shafts 11 and 13 are mutually supported by a bearing 14, the inner bearing race being mounted on a spigot on the end of the shaft 13 while the outer bearing race is mounted in a bore in the shaft 11, the two coupling elements being rotatable about a common axis A—A. The interiors of the two elements constitute respectively a pump chamber and a turbine chamber, these two chambers together forming the usual toroidal-shaped working chamber which contains a quantity of working liquid, usually an oil. Each chamber is provided with the usual radially-extending, vortex-producing vanes 15 and 16 respectively.

A plurality of radially-extending, air-moving vanes 17 are mounted on the exterior wall of the pump element 10, between the said exterior wall and a shroud member 18; as the pump element rotates cooling air is moved by the centrifugal action of the vanes over the outer surface of the pump element in the direction of the arrows 19. An extension 20 of the pump element surrounds the turbine element in known manner to retain the working liquid in the coupling, a sealing element 21 providing a rotatable, fluid-tight joint between the axially-extending, radially-inner end 22 of the extension 20, and the adjacent portion of the shaft 13.

The pump element 10 extends radially inwardly toward the axis A—A somewhat more than the turbine element, so that a step 30 is formed. Vent means carried by the pump element comprise a first vent tube 31 providing a vent bore 32 with an inlet 33 opening to the radially innermost part of the pump element downstream of the step 30, while the outlet 34 of the bore opens to the interior of a valve body 35. A deflector plate or hood 36 extends over the inlet 33 to protect it from reverse flow of working liquid. The vent means also comprise a second vent tube 37, providing a vent bore 38 with an inlet 39 opening to the approximate operative centre of the working chamber, while its outlet 40 opens into the valve body 35. The opening and closing of an outlet 41 from the valve body 35 to the ambient atmosphere is controlled by a centrifugally-operated valve constituted by a ball 42 under the bias of a compression spring 43.

In the operation of the coupling, with both elements at rest the working liquid drains under gravity to the lowermost part of the working chamber. Since the valve 35 is stationary it is closed and none of the working liquid can leak therefrom. As the pump element rotates the liquid is distributed around the chambers and the vortices which transfer the power between the two elements are quickly established, so that driving torque is applied to the turbine element, causing the turbine to rotate. Under normal operating conditions (i.e. normal operating speed, normal load and about 2 – 3 percent slip), these vortices are of approximately circular cross-section in a plane containing the said axis A—A, having a boundary as indicated by the solid line 44 in FIG. 1, the liquid forming these vortices flowing generally in the direction of the arrows 45. At some point below the normal operating speed the centrifugal force applied to the ball 42 is sufficient to open the valve 35.

If the turbine element is now stalled or overloaded, so that there is an appreciable increase in slip between the elements, the vortices begin to elongate radially inwards toward the axis A-A until eventually the liquid flows over the interior coupling walls. In some embodiments the volume of liquid available to form them is reduced by removing a part of the working liquid to a reservoir, for example as described in my Canadian Pat. No. 896,311, the disclosure of which is incorporated herein by reference. The vortices are now of what is called herein of "attenuated" form, being of generally hollow cross-section in the said plane to leave a toroidal-shaped space in their centres, as indicated by the broken line 46 in FIG. 1.

The toroidal space within the attenuated vortices is fully vented to the ambient atmosphere via the vent tube 37, which will now empty itself of the liquid that it contained while the normal vortices were established. Although the liquid of the attenuated vortices flows over the interior walls, the inlet 33 to the vent pipe 31 is shielded by being downstream of the step 30, so that the liquid tends to pass thereover, and by the presence of the hood 36, extending over the tube inlet 33, so that no liquid escapes from the outlet 34.

It will now be seen that at all times that the pump element is rotating sufficiently fast for the valve 35 to be opened the coupling is fully vented to the ambient atmosphere, and protected against dangerous internal pressures, for all operating states of the vortices within the working chamber. Such conditions are of course only present when the pump is being driven by the prime mover and excessive slip is occurring between the pump and the turbine. Venting will also occur if the turbine is over-running the pump, since the transfer of torque between them will usually be sufficient for the turbine to drive the pump fast enough to open the valve 35, unless of course the drag from the prime mover is excessive. Since the total amount of working liquid is insufficient to completely fill the working circuit, then either the inlet 33 or the inlet 39 must be located in a liquid-free space and able to vent therefrom any gas and/or vapour and/or foam under pressure greater than ambient. It will be understood that boiling or other effects can convert the working liquid to a space-filling foam that may require venting.

In embodiments in which a liquid-free space is provided by a step between the turbine and pump it is preferred to provide a shield ring 56 in case of reverse flow of liquid in the coupling, which would tend to enter the hub. For the cooling of the couplings of this invention reference may be made to the disclosure of my U.S. Pat. No. 3,074,234 which is incorporated herein by reference.

Figure 2:
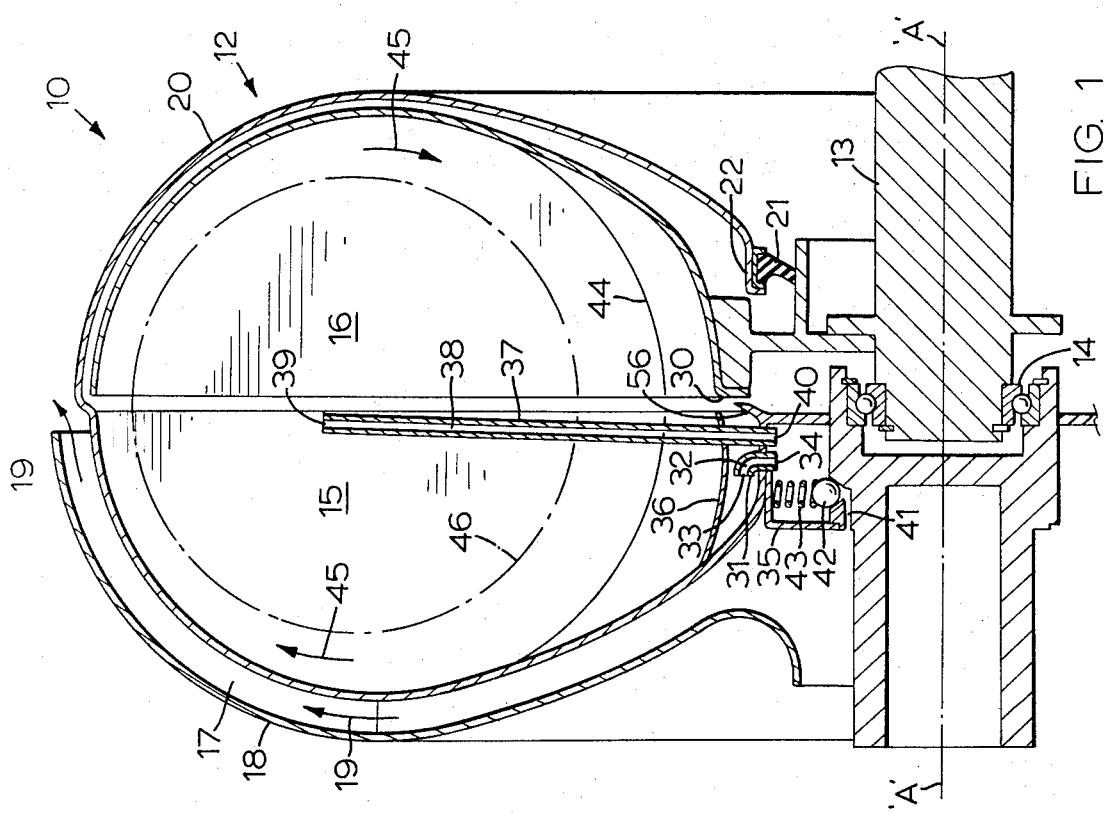

In the embodiment illustrated by FIG. 2 a single vent tube 37 is used by adding an extension 37 to the tube 31, the tube being provided downstream of the step 30, and with the inlet 33 on the downstream side of the tube, so that the liquid flowing in the vortices will not enter the tube. The single tube therefore serves to vent for all conditions of the vortices.

Figure 3:
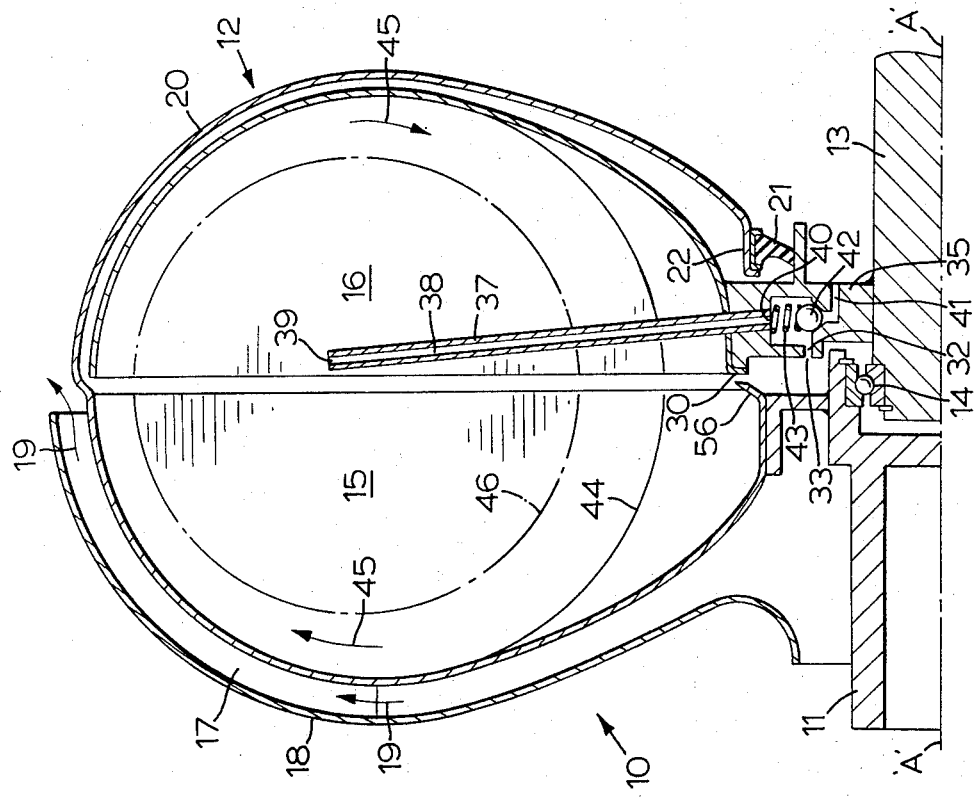

In the embodiment illustrated by FIG. 3 the liquid-free space into which the vent pipe extends is caused by a partition 49 carried by the vanes of the turbine, a partition 50 carried by the pump vanes being an extension thereof and shielding the inlet 33 against splashes along the vanes when the liquid from the stalled or slowed turbine hits the rotating pump vanes. In view of the fact that liquid can enter the vent pipe 31 during reverse flow when the turbine is over running the pump this pipe discharges at 34 into the inlet 51 of another pipe 52 having an outlet 53 adjacent the inlet 39 of vent pipe 37. Liquid entering the pipe 31 returns under centrifugal force via the pipe 52 to the interior of the working chamber; complete shielding of the inlet 33, such as is provided by the partition 36 of the preceding embodiments, is not therefore required, and in some embodiments the partition 50 can be omitted entirely. Any gas entrained with the liquid is again vented to the atmosphere via the pipe 37. The rotational speed of the pump element at which the valve 35 opens and closes is not critical, but must be less than the speeds that are obtained when the turbine element is operating under the most severe conditions encountered, namely a complete stall thereof.

It will be seen therefore that in designing the coupling the possibility of high internal pressures need not be considered, so that there is a corresponding reduction in the need for walls of sufficient thickness to withstand such pressures and/or for the provision of the above mentioned fusible plugs. Many sizes of hydraulic couplings, which hitherto have required cast or machined pump and turbine elements to achieve the strength necessary to avoid the possibility of disruption or explosion by internal pressure, can therefore be manufactured using instead stamped or pressed elements of relatively thin sheet metal, with a consequent substantial reduction in weight and manufacturing cost. An added benefit is the resulting reduction in inertia of the coupling, giving with an electric motor as prime mover a lowered starting current and shortened starting time.

Figure 4:
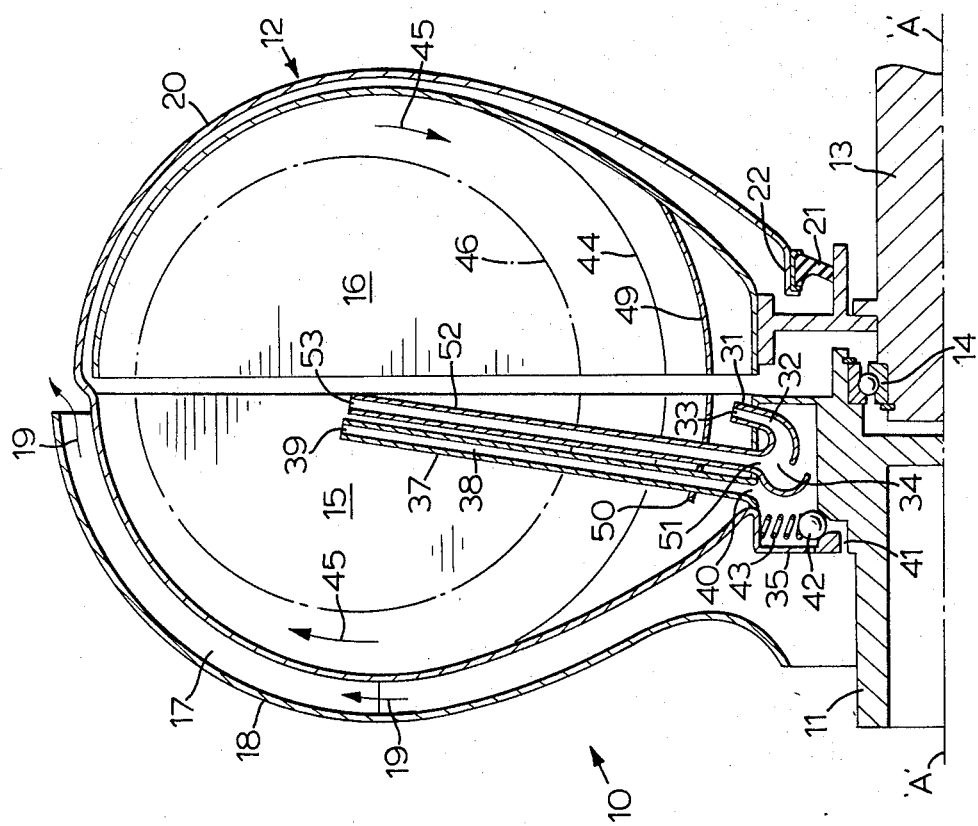

The embodiment of FIG. 4 differs from any of the preceding embodiments in that the vent bores 32 and 38 etc. are provided in the turbine and not in the pump. The bore 38 is provided by the vent pipe 37 carried by the turbine boss, which also constitutes the body 35 for the centrifugally operated valve. The bore 32 is formed directly in the valve body and communicates with the radially inner part of the coupling via an annular liquid-free space formed between the bosses of the pump and turbine, the entrance thereto from the pump being shielded by ring 56 in case of reverse flow.

I claim:

1. A hydraulic coupling comprising power input and power output means, a pump element and a turbine element mounted upon respective hub members which are connected respectively to the power input and power output means for rotation of the elements therewith about a common axis and providing respectively co-operating pump and turbine chambers, said chambers together forming a working chamber, a plurality of radially-extending vortex-producing vanes in each of the pump and turbine chambers, a quantity of working liquid in the said working chamber, vent means carried by one of said elements providing a vent bore having an inlet opening into the interior of the respective chamber at a liquid-free radially inner part thereof at or closely adjacent to the respective hub member and an outlet opening to the exterior of the working chamber, and a valve closing the said bore against passage of liquid therethrough while the respective element is stationary and opening the bore when the element is rotating at more than a predetermined minimum speed.

2. A hydraulic coupling as claimed in claim 1, wherein the said liquid-free space is provided in the pump element by partitions extending between the turbine vanes adjacent the turbine hub member and deflecting the liquid forming the vortices away from the vent bore inlet.

3. A hydraulic coupling as claimed in claim 1, wherein the pump element hub member extends closer to the said common axis than the turbine element hub member to form a radially-extending step between the turbine and pump hub members, and the vent bore inlet opening is disposed downstream of the step radially inwardly thereof.

4. A hydraulic coupling as claimed in claim 1, wherein the said vent means provides a vent bore having another inlet opening approximately to the centre of attenuated vortices established in the working chamber under stall or equivalent conditions.

5. A hydraulic coupling as claimed in claim 4, wherein the first mentioned inlet opening and the said another inlet opening are provided by a single vent tube.

6. A hydraulic coupling as claimed in claim 1, wherein the said vent bore is permanently open to another bore receiving liquid passing through the vent bore and returning it to approximately the centre of attenuated vortices established in the working chamber under stall or equivalent conditions.

7. A hydraulic coupling as claimed in claim 1, wherein the first-mentioned inlet opening is provided in the turbine element hub member between the pump and turbine element hub members.

* * * * *